US006745848B1

United States Patent
Mosdal et al.

(10) Patent No.: US 6,745,848 B1
(45) Date of Patent: Jun. 8, 2004

(54) TOWER AND WHEEL ARM ASSEMBLY

(75) Inventors: Brian Thomas Mosdal, Ankeny, IA (US); James Thomas Noonan, Bondurant, IA (US); David Lee Steinlage, Dallas Center, IA (US); Garrett Lee Goins, Ankeny, IA (US); Anthony Scott Royer, Adel, IA (US); David Alan Payne, Urbandale, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/361,723

(22) Filed: Feb. 6, 2003

(51) Int. Cl.$^7$ .............................................. A01B 63/00
(52) U.S. Cl. ...................... 172/452; 172/776
(58) Field of Search ................... 172/311, 452, 172/322, 462, 669, 675, 776, 421, 400; 111/52, 53, 57; 180/209, 219

(56) References Cited

U.S. PATENT DOCUMENTS

| | | | |
|---|---|---|---|
| 4,681,335 A | * | 7/1987 | Ledermann et al. ..... 280/446.1 |
| 4,696,349 A | * | 9/1987 | Harwood et al. ........... 172/323 |
| 5,232,054 A | * | 8/1993 | Van Blaricon et al. ..... 172/311 |
| 5,488,996 A | * | 2/1996 | Barry et al. ................. 172/311 |
| 5,740,870 A | * | 4/1998 | Rodgers et al. ............. 172/456 |
| 6,003,616 A | * | 12/1999 | Goins et al. ................. 172/669 |
| 6,374,923 B1 | * | 4/2002 | Friggstad .................... 172/383 |
| 6,554,078 B1 | * | 4/2003 | McDonald ................... 172/69 |
| 6,679,339 B1 | * | 1/2004 | Steinlage et al. ........... 172/395 |

OTHER PUBLICATIONS

Deere & Company, 980 Field Cultivator Parts Catalog, p. 22, date of publication—May 5, 1998, published in U.S.A.
Deere & Company, copending and commonly assigned patent application S.N. 10/326,672 filed Dec. 19, 2002 entitled Implement Lift and Level System with a Front Mounted Direct Coupled Rockshaft.

* cited by examiner

Primary Examiner—Victor Batson

(57) ABSTRACT

A tower and wheel arm assembly for an implement frame includes a pair of identical single piece pivot castings which are selectively connectible at different locations along the frame and provide both wheel arm pivoting and a cylinder anchor tower pivoting. The wheel arm axle extends between the castings pivots within cylindrical cavities located in the castings. External cylindrical surfaces concentric with the cavities rotatably support a pair of tower plates which include circular openings received over the external cylindrical surfaces. Casting symmetry allows the same part to be used interchangeably for either the right-hand or left-hand support.

20 Claims, 4 Drawing Sheets

TOWER AND WHEEL ARM ASSEMBLY

FIELD OF THE INVENTION

The present invention relates generally to lift assemblies for implement frames and, more specifically, to a lift wheel arm tower bearing assembly.

BACKGROUND OF THE INVENTION

Multi-section frames for agricultural implements such as field cultivators or similar soil working implements typically include a main frame and wing sections hinged to opposite sides of the main frame. Wheel assemblies including a wheel arm pivotally connected to frame-mounted axle support the frame sections and provide lift functions for moving the implement between a raised transport position and a lowered field-working position. The wheel assemblies can also function to provide adjustable depth control for the soil-engaging tools on the frame.

In some wheel assemblies, particularly those that support the wing sections, a cylinder anchor tower is pivotally connected to the wheel arm axle for pivoting about the same axis as the wheel arm. The upper end of the tower is connected to one end of an adjustable length linkage, and the opposite end of the linkage is connected to the frame to secure the tower at the desired angle. A cylinder is connected between the wheel arm and the tower. By adjusting the length of the linkage, the wheel assembly position relative to the frame can be changed for leveling frame.

Most previously available wheel arm support and tower assemblies are fairly complex and utilize numerous components. Frictional contact resulting from relative rotation between the tower and the wheel axle each time the wheel arm is moved to raise or lower the implement results in considerable wear. The tower requires expensive welded pivot collars or a casting with a pivot which makes the component heavy and difficult to install and to disassemble. Present support and tower construction is heavy, and convenient positioning of the wheel assembly to a location best optimizing the earthworking tool pattern often is not possible.

SUMMARY OF THE INVENTION

It is therefore an object of the invention to provide an improved tower and wheel arm assembly for an implement. It is another object to provide such an assembly which overcomes most or all of the aforementioned problems.

It is also another object of the present invention to provide an improved tower and wheel arm assembly which is simpler and less expensive than at least most previously available assemblies. It is a further object to provide such an assembly having fewer components than most assemblies.

It is yet another object of the present invention to provide an improved tower and wheel arm assembly having an improved bearing arrangement. It is another object to provide such an assembly wherein the tower does not require special bearings or pivot collars and is less subject to wear than at least most previously available towers. It is a further object to provide an assembly wherein lubricated tower bearings are obviated.

A tower and wheel arm assembly includes a pair of single piece pivot castings which are selectively connectable at different locations along the frame and provide both wheel arm pivoting and cylinder anchor tower pivoting. The wheel arm axle extends between the castings and pivots within cylindrical cavities located in the castings. External cylindrical surfaces concentric with the cavities rotatably support a pair of tower plates which include circular openings received over the external cylindrical surfaces.

The dual pivoting function of the one-piece castings provides a simple and relatively inexpensive support arrangement for the wheel arm and tower and eliminates frictional wear between the tower and the axle which otherwise normally occurs when the wheel arm is pivoted to raise and lower the implement. Tower bearing lubrication is not required. Symmetrical casting configuration allows use of the same part for either the right-hand or left-hand support. Simple plate towers which are light in weight may be utilized. A compact, sturdy bearing structure is provided that is easy to connect at various locations along the frame. Assembly and disassembly of the structure is relatively fast and easy. Compared to at least most previously available support and tower constructions, the present assembly is generally lighter and provides more convenient positioning of the assembly for optimizing the tool pattern.

These and other objects, features and advantages of the invention will become apparent from the description below in view of the drawings.

DESCRIPTION OF THE PREFERRED EMBODIMENT

Figure 1:
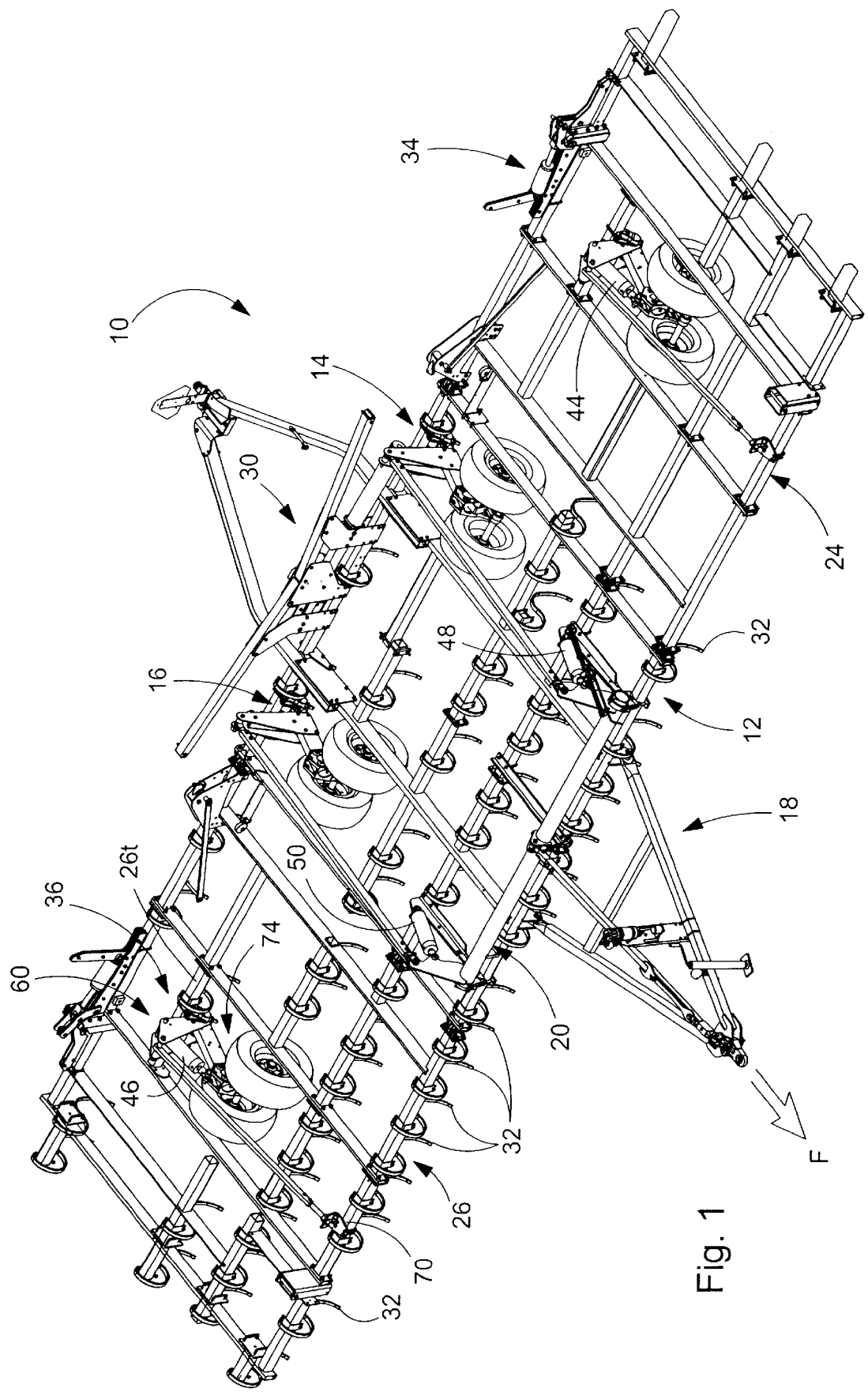
FIG. 1 is a perspective view of a multi-section implement with tower and wheel arm assembly structure attached, with some parts removed for clarity.

Referring now to FIG. 1, therein is shown an agricultural implement such as a field cultivator 10 having a main frame 12 supported by lift wheel assemblies 14 and 16 pivotally connected to the frame 12. A hitch assembly 18 is pivotally connected to the forward portion of the frame 12 for connection to a tractor for forward movement (F) over the ground. The lift wheel modules or assemblies 14 and 16 are connected to a hydraulically operated lift linkage assembly indicated generally at 20 for pivoting the assemblies 14 and 16 to move the implement vertically. Outer frame or wing sections 24 and 26 are hinged to opposite sides of the main frame 12 for pivoting between a folded transport position and an extended working position (shown) by wing fold cylinder structure indicated generally 30. Earthworking tools 32 are supported by the frame 12 and wing sections 24 and 26. Some tools have been removed in FIG. 1 for clarity and to better show the wheel assemblies.

Wing lift wheel arm and tower assemblies 34 and 36 are connected at selectable locations on the wing frames 24 and 26 to adjustably support the frames. The assemblies 34 and 36 include lift cylinders 44 and 46 which operate generally in unison with cylinders 48 and 50 of the lift linkage assembly 20 to raise and lower the frames 24 and 26 with the main frame 12. A more detailed description of the frame shown in FIG. 1 may be found in our copending and commonly assigned patent application Ser. No. 10/326,672 filed Dec. 19, 2002 entitled IMPLEMENT LIFT AND LEVEL SYSTEM WITH A FRONT MOUNTED DIRECT COUPLED ROCKSHAFT. However, it is to be understood that the frame structure is given by way of example only and that assemblies 34 and 36 may be utilized with other types of frames.

Figure 2:
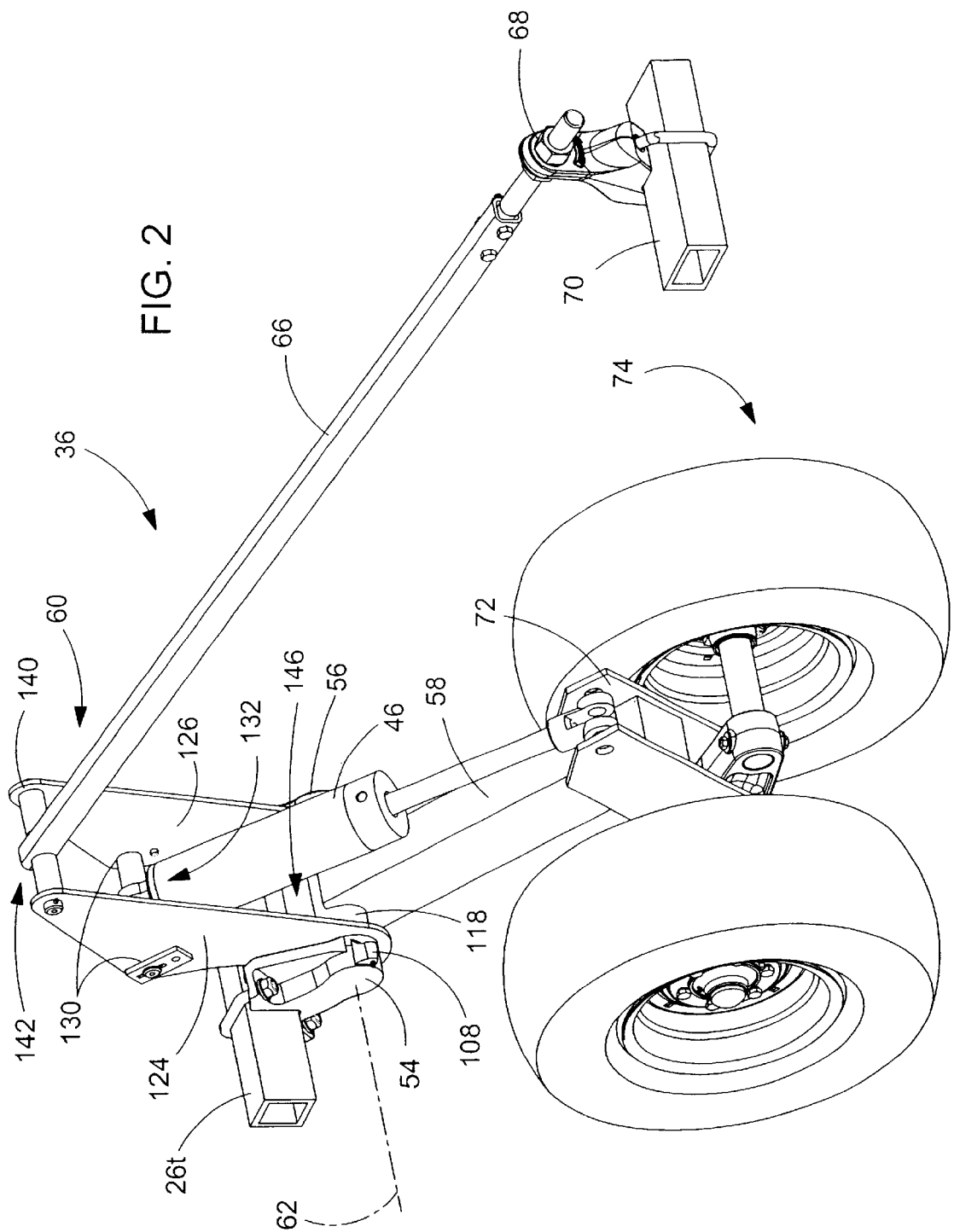
FIG. 2 is an enlarged front perspective view of the tower and wheel arm assembly structure of FIG. 1.
Figure 3:
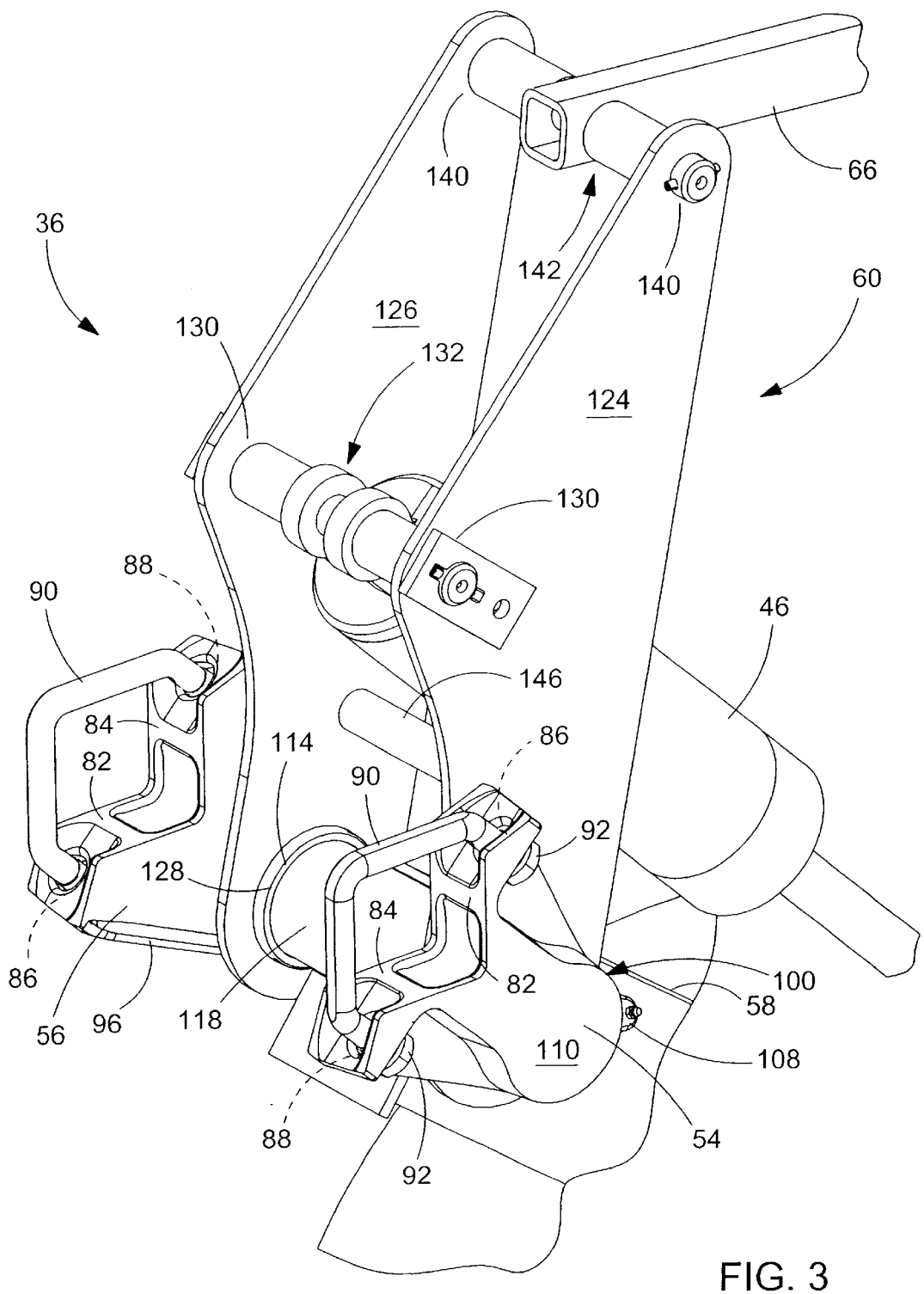
FIG. 3 is an enlarged rear perspective view of a portion of the structure of FIG. 2.
Figure 4:
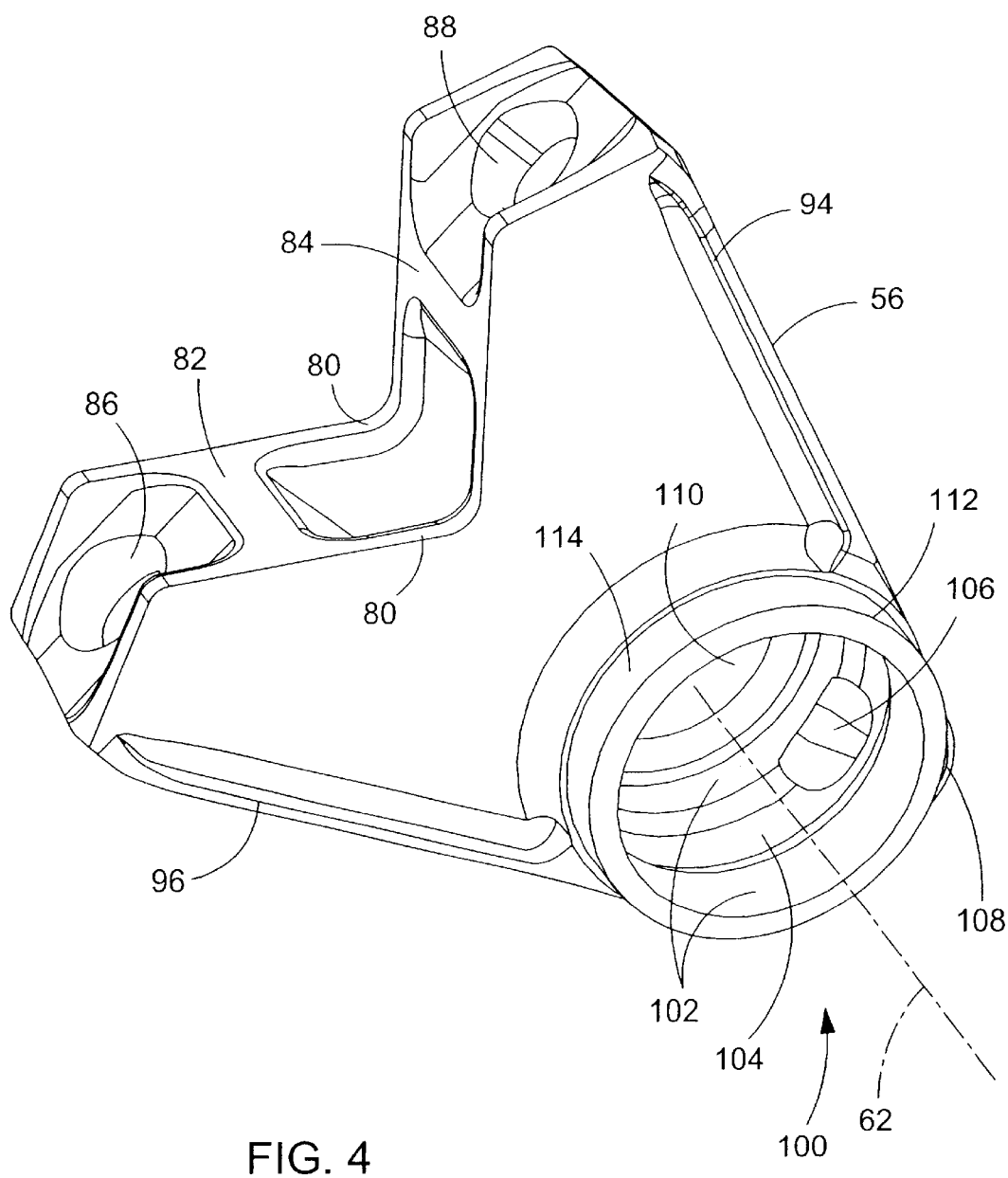
FIG. 4 is an enlarged side perspective view of the casting utilized with the structure of FIG. 2

Referring now to FIGS. 2–4, the wheel arm and tower assembly 36 will be described in detail. The construction of the assembly 36 is generally identical to that of the assembly 34. The assembly 36 includes a pair of identical reversible pivot bearing castings or brackets 54 and 56 connected to a transverse tube 26t of rectangular cross section forming a portion of the wing frame 26. The castings 54 and 56 pivotally support a wheel arm 58 and a tower 60, each individually rotatable about an axis 62 which extends transversely to the forward direction F. An adjustable length link 66 is connected between the upper end of the tower 60 and a bracket 68 connected to a forward rank or frame member 70 (FIG. 1) of the implement frame. The cylinder 46 includes a base end connected to the tower 60 between the axis 62 and the link 66. The rod end of the cylinder 46 is connected to a lower wheel arm bracket 72 which also supports a walking beam wheel assembly 74. Cylinder extension and retraction raises and lowers the wing frame 26, while adjusting the length of the link 66 changes the position of the base end of the cylinder 46 to adjust wheel position for a given cylinder rod extension or retraction for leveling the implement and providing working depth adjustment for the tools on the wing frame.

The brackets 54 and 56 are generally identical and are shown as a unitary casting. A mounting area 80 (FIG. 4) includes faces 82 and 84 formed at a right angle to each other to abut adjacent bottom and forward faces of the supporting frame member. Apertures 86 and 88 receive threaded legs of U-bolts 90 which extend around the remaining faces of the frame member. Nuts 92 are threaded on the legs to secure the casting firmly against the frame member. Peripheral reinforcing ribs 94 and 96 extend downwardly and forwardly from the mounting area 80 to a cylindrical bearing cavity area 100. The cavity area 100 includes axle bearing surface structure 102 with a central annular lubrication groove 104 in communication with a lubrication channel 106 located in a grease zerk receiving projection 108. The projection 108 is located to optimize tool clearance. The end of the cavity area 100 is closed at a side 110 to protect the area from contamination. A cylindrical mast support bearing or shoulder 112 projects axially from the open side of the cavity area 100 and includes a fixed cylindrical bearing surface 114 centered on the axis 62. A cylindrical axle or wheel arm pivot 118 is fixed to the wheel arm 58 and includes opposite ends inserted into the cavity areas 100 and supported for rotation about the axis 62 within the bearing surfaces 102. The tower 60 is supported on the fixed bearing surfaces 114 of a pair of the brackets 54, 56 for rotation about the axis 62 as the length of the link 66 is adjusted.

As shown, the tower 60 is fabricated from a pair of generally identical upright, transversely spaced plates 124 and 126 having lower ends with apertures 128 received over the bearing surfaces 114. The plates 124 and 126 extend upwardly to cylinder base end mounting areas 130 which receive a pivot pin and spacer assembly 132 for pivotally connecting the base end of the cylinder 46 between the plates 124 and 126 and for maintaining proper spacing between the plates at the cylinder mounting areas. The plates 124 and 126 extend upwardly to a link mounting areas 140 located forwardly and above the cylinder mounting areas 130. A link pivot pin and spacer assembly 142 is supported in apertures in the link mounting areas for pivotally connecting the aft end of the link 66 to the upper end of the tower and for maintaining the proper spacing between the upper ends of the plates 124 and 126. A spacer assembly 146 extends between the lower ends of the plates 124 and 126.

The spacer assemblies 132, 142 and 146 maintain the plates 124 and 126 in a parallel relationship. The brackets 54 and 56 are mounted on the frame so that the bearing surfaces 102 and 114 are spaced for good support of the axle 118 and the tower 60. For assembly, the pivot bearing castings 54 and 56 can be located on the desired frame member at a location best suited for the tool pattern to avoid interference. Initially, the castings 54 and 56 are loosely mounted on the frame, and the axle 118 and the tower 60 are positioned relative to the castings. Thereafter, the castings 54 and 56 are slid towards each other to capture the axle 118 and the tower 60. The nuts 92 are then tightened onto the threaded ends of the bolts 90 to secure the castings in position. The assemblies 34 and 36 can be disassembled by simply loosening one or both of the castings and sliding the castings apart. The entire assembly can be easily adjusted transversely on the frame member or moved to a different mounting location. Relative rotation between the tower 60 and the tower support bearing surfaces 114 only occurs when adjustments are made to the wheel position by changing the length of the link 66, and therefore lubrication is not required at the surfaces 114. The symmetry of the brackets 54 and 56 about a transversely extending plane bisecting each bracket and lying on the axis 62 (see FIG. 4) permits the bracket to be positioned with the cavity area 100 opening either to the left or to the right so that a single casting configuration can be used for both brackets to reduce parts numbers and decrease manufacturing costs.

Having described the preferred embodiment, it will become apparent that various modifications can be made without departing from the scope of the invention as defined in the accompanying claims.

We claim:

1. A wheel arm and tower assembly for mounting on a frame of an agricultural implement, the frame extending transversely to a forward direction of travel of the implement, the assembly comprising:

first and second bearing brackets selectively connectible to the frame, the brackets including wheel arm pivot areas and tower pivot areas;

a wheel arm assembly including a wheel arm and a wheel arm axle received by and supported in the wheel arm pivot areas for rotation of the wheel arm about a wheel arm axis;

an upright tower including lower apertured areas received over and rotatably relative to the tower pivot areas for rotation generally about the wheel arm axis;

a cylinder mounted between the tower and the wheel arm assembly for pivoting the wheel arm assembly relative to the tower about the wheel arm axis; and wherein frictional rotational contact between the tower and the tower pivot areas occurs upon rotation of the tower bearing relative to the bearing brackets and is independent of rotation of the wheel arm about the wheel arm axis.

2. The assembly as set forth in claim 1 wherein the first and second bearing brackets comprise individual brackets which are generally identical and interchangeable.

3. The assembly as set forth in claim 1 wherein the first and second bearing brackets comprise unitary castings.

4. The assembly as set forth in claim 1 wherein the bearing brackets are individually mountable and movable relative to the implement frame to facilitate positional adjustments of the wheel arm assembly and removal of the wheel arm assembly from the frame.

5. The assembly as set forth in claim 1 wherein the bearing brackets include cylindrical bearing cavities defining the wheel arm pivot areas and cylindrically shaped shoulders extending outwardly from the cavities and defining the tower pivot areas.

6. The assembly as set forth in claim 5 wherein the wheel arm axle is fixed to the wheel arm and is rotatably received by the bearing cavities.

7. The assembly as set forth in claim 1 wherein the tower comprises first and second upright spaced plates, and the apertured areas comprise circular holes at lower ends of the plates received over the tower pivot areas.

8. The assembly as set forth in claim 7 wherein the first and second bearing brackets are adjustable transversely relative to each other on the frame for selectively capturing the apertured areas on the tower pivot areas.

9. The assembly as set forth in claim 1 wherein the tower pivot areas comprise cylindrical shoulders extending from the wheel arm pivot areas.

10. The assembly as set forth in claim 9 wherein the wheel arm pivot areas comprise cylindrically shaped cavities and the cylindrical shoulders have an axis coinciding with the wheel arm axis.

11. A wheel arm and tower assembly for mounting on a frame of an agricultural implement, the frame extending transversely to a forward direction of travel of the implement, the assembly comprising:

first and second bearing brackets selectively connectable to the frame, the brackets including wheel arm pivot areas and tower pivot areas;

a wheel arm assembly including a wheel arm and a wheel arm pivot received by and supported in the wheel arm pivot areas for rotation of the wheel arm about a wheel arm axis;

an upright tower including lower apertured areas received over and rotatably relative to the tower pivot areas for rotation generally about the wheel arm axis;

an adjustable length member connected between the frame and the upright tower for pivotally adjusting the tower relative to the bearing brackets;

a cylinder mounted between the tower and the wheel arm assembly for pivoting the wheel arm assembly relative to the tower about the wheel arm axis; and wherein frictional rotational contact between the tower and the tower pivot areas occurs upon adjustment of the adjustable length member and is independent of rotation of the wheel arm about the wheel arm axis.

12. The assembly as set forth in claim 11 wherein the first and second bearing brackets comprise individual brackets which are generally identical and interchangeable.

13. The assembly as set forth in claim 11 wherein the first and second bearing brackets comprise unitary castings having a lubrication channel for lubrication of the wheel arm pivot.

14. The assembly as set forth in claim 11 wherein the bearing brackets are individually mountable and movable relative to the implement frame to facilitate positional adjustments of the wheel arm assembly and removal of the wheel arm assembly from the frame.

15. The assembly as set forth in claim 11 wherein the bearing brackets include cylindrical bearing cavities defining the wheel arm pivot areas and having a closed and open sides, and further including cylindrically shaped shoulders extending outwardly from the cavities in the direction of the open sides and defining the tower pivot areas.

16. The assembly as set forth in claim 15 wherein the wheel arm pivot is fixed to the wheel arm and is rotatably received by the bearing cavities.

17. The assembly as set forth in claim 11 wherein the tower comprises first and second upright spaced plates, and the apertured areas comprise circular holes at lower ends of the plates received over the tower pivot areas.

18. The assembly as set forth in claim 17 wherein the first and second bearing brackets are adjustable transversely relative to each other on the frame for selectively capturing the apertured areas on the tower pivot areas.

19. The assembly as set forth in claim 11 wherein the tower pivot areas comprise cylindrical shoulders extending from the wheel arm pivot areas.

20. The assembly as set forth in claim 19 wherein the wheel arm pivot areas comprise cylindrically shaped cavities and the cylindrical shoulders have an axis coinciding with the wheel arm axis.

* * * * *